June 24, 1958  J. R. WIRT ET AL  2,840,474
PELLUCID COMPOSITION AND METHOD FOR COATING
FOODSTUFFS AND ARTICLES THEREBY OBTAINED
Filed Jan. 23, 1956

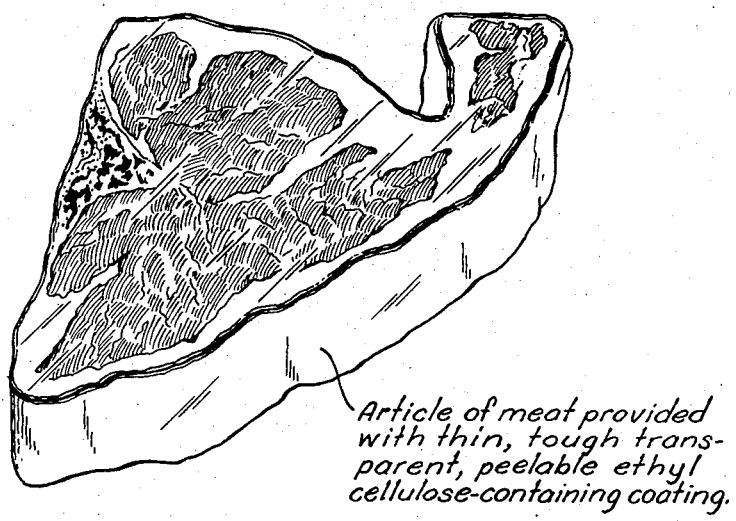

Fig. 1 — Article of meat provided with thin, tough, transparent, peelable ethyl cellulose-containing coating.

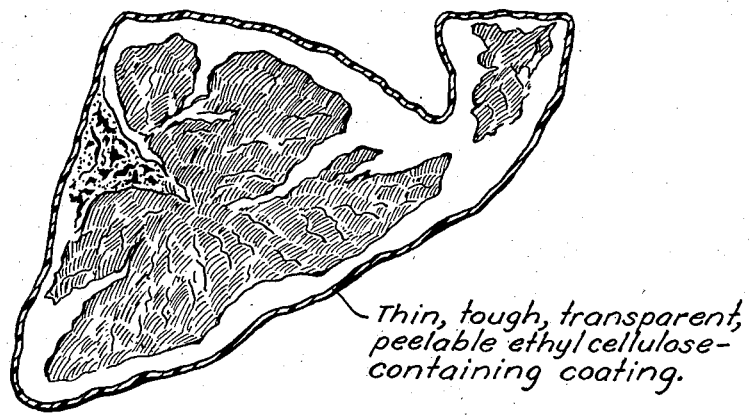

Fig. 2 — Thin, tough, transparent, peelable ethyl cellulose-containing coating.

INVENTORS.
James R. Wirt
Harold C. Kelly
Richard M. Krajewski
BY Griswold & Burdick
ATTORNEYS

United States Patent Office 2,840,474
Patented June 24, 1958

2,840,474

PELLUCID COMPOSITION AND METHOD FOR COATING FOODSTUFFS AND ARTICLES THEREBY OBTAINED

James R. Wirt, Harold C. Kelly, and Richard M. Krajewski, Midland, Mich., assignors to The Dow Chemical Company, Midland, Mich., a corporation of Delaware Application January 23, 1956, Serial No. 560,608

10 Claims. (Cl. 99—166)

This invention relates to coating compositions comprising cellulose ethers which are especially suited for enveloping certain articles of food, particularly meat and meat products, in transparent, tightly-adhering protective coatings which may readily be stripped or peeled from the article. More particularly, it is concerned with such a coating composition which is applied from the molten condition. In order to avoid sesquipedalian and cumbrous expressions, compositions of this nature are frequently referred to as "hot melts" and will be characterized by such term in the following description and specification. The invention also has reference to a method for coating food articles with such compositions and to coated articles thereby obtained.

It would be advantageous to provide certain articles of food, particularly meat and meat products, with tough, closely conforming coatings which have protective and preservative value and which could be readily removed by clean and efficient stripping or peeling operations. It would be additionally beneficial for such a coating to be imbued with other desirable characteristics, including flexibility at temperatures which are commonly encountered in refrigerators and food freezers; transparency and attractive appearance even when the coated article is in a hard frozen condition at relatively low temperatures; relatively high impermeability to gases and water or other common vapors to minimize or prevent the occurrence of oxidation, dehydration or contamination in the coated foodstuff; and, as a primary requirement, absolute non-toxicity, i. e., freedom from any tendency to transfer harmful materials to the foodstuff. It would be highly desirable for such coatings to be obtainable from readily available and inexpensive materials and to be utilizable in a convenient and economic manner.

These and other desirable advantages and benefits may be derived with the coating composition of the present invention which is comprised of a mixture consisting essentially of between about 19 and 28 and preferably between 21 and 24 parts by weight of ethyl cellulose; between about 39 and 73.5 and preferably between 55 and 68 parts by weight of a refined mineral oil; not more than about 5.0 and preferably between 0.7 and 2.8 parts by weight of a plasticizer selected from the group of plasticizers consisting of glycerol monooleate, n-butyl stearate, glycerol monostearate and mixtures thereof; not more than about 5.0 and preferably between 0.7 and 2.8 parts by weight of acetylated mono-glyceride; between about 7.0 and 20.0 and preferably between 9.2 and 14.6 parts by weight of castor oil; and, optionally and advantageously, between about 0.5 and 3.0 and preferably between 1.5 and 2.0 parts by weight of a suitable non-toxic antioxidant material for the ethyl cellulose. It is desirable for a total of about 100 parts by weight of all the ingredients to be present in the formulated composition.

The improved compositions of the present invention ordinarily form molten mixtures at temperatures in excess of the boiling point of water. They may be applied in any desired manner to articles which may be at any temperature beneath that of the hot melt. Advantageously, particularly when fresh meat or meat products are involved, the coating composition may be applied by a method which comprises freezing the article, or at least the surface of the article, of food to be coated; and coating the frozen article with the molten composition. Such a method is beneficial in that the surface of the article being coated, particularly meats and the like, is less likely to attain discoloring temperatures and those causing vaporization of surface juices. While brushing, spraying and other techniques may be employed in order to apply the coating composition to the article, it is frequently more expedient to employ dip coating techniques for this purpose wherein the article is dipped in the molten composition to effect the coating "pick up," after which it is withdrawn and the applied coating composition permitted to cool and harden.

Coated articles of food, particularly meats, in accordance with the present invention have a highly attractive and exceptionally pleasing appearance. The coating has absolute transparency over a wide temperature range, even at temperatures as low as those in the neighborhood of about −20° F. and lower. This desirable feature permits a ready visual inspection and evaluation to be made of the coated foodstuff. The coating is not sticky, oily, greasy or otherwise uncomfortable to touch or handle. It adheres tightly as a thin, limpid film about the article and conforms closely to its contours, even when bony meats or fowl are involved. It is non-toxic and odorless and does not impart odors or tastes to the food which is coated. It is readily peelable, cuttable or strippable in a clean and efficient manner from the article of food and does not require washing or other tedious and inconvenient procedures for its complete removal. In addition, the coating is relatively flexible at temperatures as low as about 0° F. so that it resists damage due to handling and storage of a coated article being maintained in a frozen condition. It also has an extremely low rate of gas and water vapor transmission, comparable to those which are found in other distinct varieties of ethyl cellulose type coatings, so that the coated articles may be preserved in a better condition and are less susceptible to becoming rancid or dehydrated or to develop "freezer burn." In addition, the coating composition of the present invention effectively prevents the absorption of undesirable foreign odors and tastes in the food product.

The ethyl cellulose which may be employed in the practice of the present invention is a commonly available material having an ethoxyl content in the range from about 47.5 to about 50 percent by weight. It should have a low viscosity of less than about 30 centipoises, as determined in a solution of about 5 percent by weight of the ethyl cellulose in a solvent mixture consisting of about 80 parts by volume of toluene and about 20 parts by volume of ethanol. It is beneficial to employ a cellulose ether having a viscosity in the neighborhood of 6–11 centipoises.

The refined oil may advantageously be a mineral oil of a paraffinic variety or it may be derived from a naphthenic petroleum source. It is desirable for light colored or water white oils to be employed. Oils having a viscosity in the range from about 80 to about 400 Saybolt units at 100° F. are ordinarily preferable.

Advantageously, glycerol mono-oleate is utilized as one of the plasticizer ingredients in the compositions of the invention from the group of plasticizers consisting of glycerol mono-oleate, n-butyl stearate, glycerol monostearate and mixtures thereof.

The acetylated mono-glyceride incorporated in the compositions of the present invention is a derived fat in which acetic acid is one of the fatty acids present. Advantageously the acetylated mono-glyceride may be derived from lard or hydrogenated lard and contains an average of at least one acetic acid group and one long chain fatty acid group per fat molecule. Preferably the acetylated mono-glyceride which is employed contains two acetic acid groups and one long chain fatty acid group for each fat molecule which is present.

Butylated hydroxy toluene may advantageously be utilized as the antioxidant material although butylated hydroxy anisole, propyl gallate and like or similar non-toxic antioxidants or antioxidant materials for ethyl cellulose may also be suitably employed in the practice of the present invention. The use of an antioxidant facilitates retention of the clear and lucid characteristics of the coating compositions of the invention.

In preparing the hot melt coating compositions of the present invention, care should be taken to select such relative proportions of the ingredients as will produce a coating having optimum characteristics. Thus, in some combinations of ingredients, a larger proportion of the ethyl cellulose may produce a more viscous hot melt than is desirable for particular operating temperatures whereas smaller proportions, in some instances, may not lend sufficient strength to the film coating. Similarly, greater amounts of oil may sometimes tend to yield an oily film coating. On the other hand, smaller amounts of oil may sometimes increase the viscosity of the hot melt beyond more desirable degrees. In an analogous manner, too great a proportion of the plasticizing ingredients may at times produce a film coating which is softer and more oily than might be otherwise obtained while too little use of such ingredients may, in certain instances, impart undesirable brittle characteristics to the film coating.

Since the hot melt compositions of the present invention are at relatively high temperatures during their application, it is advantageous to coat many articles while they are in a frozen condition. This minimizes the possibility of causing slight surface discoloration and dehydration of the foodstuff, particularly when meat and meat products are being coated, and obviates any objections to the coated articles which may arise for such reasons. The discolorations which may occur from coating food articles while they are at normal temperatures are innocuous, however, and bear no relationship to their quality or wholesomeness in any consideration other than appearance. Thus, if it is suitable, food articles which are not in a frozen condition may be coated satisfactorily with the composition of the present invention.

In many instances there may be no significant advantage to chilling or freezing the article before coating. This may be the case, for example, when various smoked or cured meats, fish or fowl are being coated. The normal, treated appearance of such foodstuffs is acceptable and does not detract from their marketability.

By way of illustration, various cuts of meat including steaks, chops and roasts from beef, lamb and pork were coated by first freezing them and then dip coating them with a hot melt at about 320° F. which was comprised of about 23.0 percent by weight of an ethyl cellulose of a viscosity grade of about 10 centipoises, which was obtained under the trade-name "Ethocel"; about 61.70 percent by weight of a refined mineral oil mixture which consisted of equal weight proportions of a refined mineral oil having a viscosity between about 345 and 355 Saybolt units at 100° F., which was obtained under the trade-name "Kaydol" and another refined mineral oil having a viscosity between about 95 and 105 Saybolt units at 105° F., which was obtained under the trade-name "White Oil L–1"; about 1.40 percent by weight of a glycerol mono-oleate derived from lard and containing an average of two acetic acid groups and one long chain fatty acid group per fat molecule, which was obtained under the trade-name "Myverol No. 70"; about 1.40 percent by weight of acetylated mono-glyceride which was obtained under the trade-name "Myvacet 9–40"; about 11.50 percent by weight of a refined and deodorized castor oil, which was obtained under the trade-name "Crystal O Castor Oil"; and, as an antioxidant, about 1.0 part by weight of butylated hydroxy toluene, which was obtained under the trade-name "Tenox BHT." After the dipping, the coating was allowed to cool and harden. All of the coated articles, as schematically illustrated in a perspective view in Figure 1 and in cross-section in Figure 2 of the accompanying drawing, had an attractive, sparkling and pleasing appearance and were not objectionable to the touch. The applied coating adhered tightly to each of the articles and conformed closely to them as a very thin, enveloping film about their various irregular contours. The coating had absolute clarity, allowing normal and unimpaired visual inspection of the coated articles which retained their essential natural appearances. The coating was tough and did not become embrittled at freezing temperatures. It could be stripped cleanly from the articles without remnants or segments of the coating adhering to the foodstuff, permitting the articles to be obtained in their normally available condition after being freed of the coating. In addition, the coating provided apparently indefinite protection against "freezer burn" when the articles were maintained in a frozen condition for long periods of time.

Equivalent good results are similarly obtainable with poultry if care is taken to suitably plug or cover the cavities in their dressed carcasses. Various cheeses may also be coated satisfactorily with hot melt compositions similar to the foregoing.

What is claimed is:

1. Transparent coating composition for articles of food which consists of a mixture, adapted to be applied as a hot melt, of between about 19.0 and 28.0 parts by weight of an ethyl cellulose having an ethoxyl content between about 47.5 and 50 percent by weight and a viscosity less than about 30 centipoises, as determined in a 5 percent by weight solution thereof in an 80:20 mixture, by volume, of toluene and ethanol; between about 39.0 and 73.5 parts by weight of a refined mineral oil having a Saybolt viscosity at 100° F. between about 80 and 400 units; not more than about 5.0 parts by weight of a plasticizer selected from the group of plasticizers consisting of glycerol mono-oleate, n-butyl stearate, glycerol monostearate, and mixtures thereof; not more than about 5.0 parts by weight of acetylated mono-glyceride; and between about 7.0 and 20.0 parts by weight of castor oil.

2. Transparent coating composition for articles of food which consists of a mixture, adapted to be applied as a hot melt, of between about 19.0 and 28.0 parts by weight of an ethyl cellulose having an ethoxyl content between about 47.5 and 50 percent by weight and a viscosity less than about 30 centipoises, as determined in a 5 percent by weight solution thereof in an 80:20 mixture, by volume, of toluene and ethanol; between about 39.0 and 73.5 parts by weight of a refined mineral oil having a Saybolt viscosity at 100° F. between about 80 and 400 units; not more than about 5.0 parts by weight of a plasticizer selected from the group of plasticizers consisting of glycerol mono-oleate, n-butyl stearate, glycerol monostearate, and mixtures thereof; not more than about 5.0 parts by weight of acetylated monoglyceride; between about 7.0 and 20.0 parts by weight of castor oil; and between about 0.5 and 3.0 parts by weight of a non-toxic antioxidant material for the ethyl cellulose.

3. Transparent coating composition for articles of food which consists of a mixture, adapted to be applied as a hot melt, of between about 21.0 and 24.0 parts by weight of an ethyl cellulose having an ethoxyl content between about 47.5 and 50 percent by weight and a viscosity in the neighborhood of about 6–11 centipoises, as determined in a 5 percent by weight solution thereof in an 80:20 mixture, by volume, of toluene and ethanol; between about 55 and 68 parts by weight of a refined mineral oil having a Saybolt viscosity at 100° F. between about 80 and 400 units; between about 0.7 and 2.8 parts by weight of a plasticizer selected from the group of pasticizers consisting of glycerol mono-oleate, n-butyl stearate, glycerol monostearate, and mixtures thereof; between about 0.7 and 2.8 parts by weight of acetylated mono-glyceride; between about 9.2 and 14.6 parts by weight of castor oil; and between about 1.5 and 2.0 parts by weight of a non-toxic antioxidant material for the ethyl cellulose.

4. The composition of claim 3 wherein glycerol mono-oleate is the plasticizer selected from the group of plasticizers consisting of glycerol mono-oleate, n-butyl stearate, glycerol monostearate and mixtures thereof.

5. The composition of claim 3 wherein the glycerol mono-oleate is derived from lard and contains an average of two acetic acid groups and one long chain fatty acid group per fat molecule.

6. The composition of claim 3 wherein the non-toxic antioxidant material for the ethyl cellulose is butylated hydroxy toluene.

7. Method for coating articles of food which comprises applying to the article, while it is being maintained at a relatively low temperature, a thin, enveloping film of a coating from a composition in molten form consisting of between about 19.0 and 28.0 parts by weight of an ethyl cellulose having an ethoxyl content between about 47.5 and 50 percent by weight and a viscosity less than about 30 centipoises, as determined in a 5 percent by weight solution thereof in an 80:20 mixture, by volume, of toluene and ethanol; between about 39.0 and 73.5 parts by weight of a refined mineral oil having a Saybolt viscosity at 100° F. between about 80 and 400 units; not more than about 5.0 parts by weight of a plasticizer selected from the group of plasticizers consisting of glycerol mono-oleate, n-butyl stearate, glycerol monostearate, and mixtures thereof; not more than about 5.0 parts by weight of acetylated mono-glyceride; between about 7.0 and 20.0 parts by weight of castor oil; and between about 0.5 and 3.0 parts by weight of a non-toxic antioxidant material for the ethyl cellulose; and cooling the applied coating on the article to a hardened condition.

8. Method for coating articles of food which comprises freezing the article of food to be coated; applying to the frozen article a thin, pellucid, enveloping film of a coating from a composition in molten form consisting of between about 21.0 and 24.0 parts by weight of an ethyl cellulose having an ethoxyl content between about 47.5 and 50 percent by weight and a viscosity in the neighborhood of about 6–11 centipoises, as determined in a 5 percent by weight solution thereof in an 80:20 mixture, by volume, of toluene and ethanol; between about 55 and 68 parts by weight of a refined mineral oil having a Saybolt viscosity at 100° F. between about 0.7 and 2.8 parts by weight of a plasticizer selected from the group of plasticizers consisting of glycerol mono-oleate, n-butyl stearate, glycerol monostearate, and mixtures thereof; between about 0.7 and 2.8 parts by weight of acetylated mono-glyceride; between about 9.2 and 14.6 parts by weight of castor oil; and between about 1.5 and 2.0 parts by weight of a non-toxic antioxidant material for the ethyl cellulose; and cooling the applied coating on the article to a hardened condition.

9. The method of claim 8 wherein the composition is applied to the frozen article by dip coating.

10. A coated food article as produced by the method of claim 7.

References Cited in the file of this patent

UNITED STATES PATENTS

| | | |
|---|---|---|
| 2,082,592 | Nollau | June 1, 1937 |
| 2,349,134 | Bradshaw | May 16, 1944 |
| 2,373,278 | Traylor | Apr. 10, 1945 |
| 2,551,463 | Ramsbottom | May 1, 1951 |
| 2,558,042 | Cornwell | June 26, 1951 |
| 2,577,211 | Scharf | Dec. 4, 1951 |
| 2,682,475 | Smith | June 29, 1954 |